Oct. 26, 1965   J. E. OLIVER   3,213,916
TIRE REMOVER

Filed April 25, 1963   2 Sheets-Sheet 1

INVENTOR.
JOSEPH E. OLIVER
BY Lothrop & West
ATTORNEYS

Oct. 26, 1965  J. E. OLIVER  3,213,916
TIRE REMOVER
Filed April 25, 1963  2 Sheets-Sheet 2

INVENTOR.
JOSEPH E. OLIVER
BY Lothrop & West
ATTORNEYS

United States Patent Office 3,213,916
Patented Oct. 26, 1965

3,213,916
TIRE REMOVER
Joseph E. Oliver, Le Grand, Calif., assignor of twenty percent to Lester J. Gendron, Madera, Calif.
Filed Apr. 25, 1963, Ser. No. 275,582
4 Claims. (Cl. 157—1.28)

The invention relates to devices for removing tires from wheel rims and, more particularly, to apparatus for dislodging tires from heavy duty wheels of the kind encountered on trucks, trailers, aircraft and farm machinery.

Owing in part to the bulk and weight of heavy duty wheels and tires, the task of removing such tires has heretofore been laborious and time consuming. Furthermore, most wheels which have been in use for any length of time tend to form an extremely tight bond with the tires installed thereon, particularly at the interface between the wheel rim flanges and the tire beads. In trying to break this bond, the expedients heretofore used such as mallets, bars etc. have frequently resulted in irreparable damage to the tire bead and adjacent tire walls.

It is therefore an object of the invention to provide a tire remover which reduces the time and effort of dislodging a tire from a heavy duty wheel to but a small fraction of that heretofore found necessary.

It is another object of the invention to provide a tire remover which not only is compact in size, and which therefore requires but a minimum of floor space, but which is also readily adaptable to installation on a repair vehicle.

It is a further object of the invention to provide a tire remover which readily breaks the bond between the inner tire bead and the adjacent inner or back rim flange, but which also can be used, where necessary, to break the bond between the outer bead and the adjacent side ring and lock ring of the wheel.

It is yet another object of the invention to provide a tire remover which is readily adjustable to fit all kinds and sizes of heavy duty wheels.

It is still a further object of the invention to provide a tire remover which is relatively economical, yet which is durable and long-lived.

It is a further object of the invention to provide a tire remover whose operation, upkeep and repair can be handled even by relatively unskilled labor and with a minimum of instruction.

It is a yet further object of the invention to provide a tire remover which, in use, does not damage the tire bead and side walls.

It is another object of the invention to provide a generally improved tire remover.

Other objects, together with the foregoing, are attained in the embodiments described in the following description and shown in the accompanying drawings in which.

Figure 1:
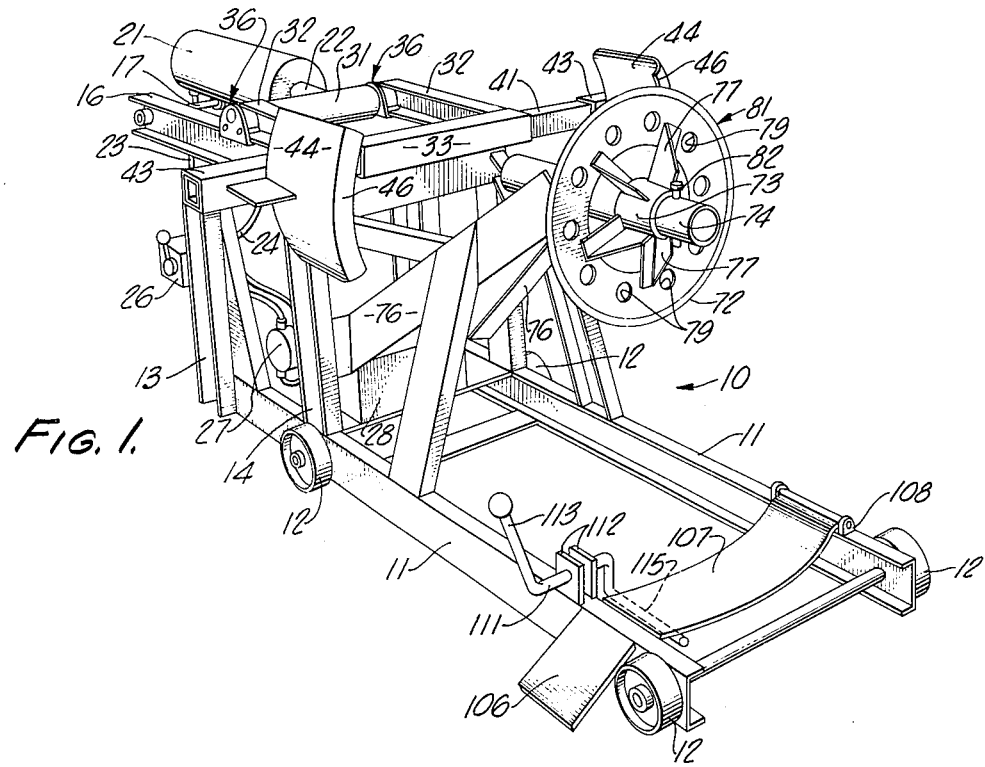
FIG. 1 is a front perspective view of the tire removing device showing the plunger in a retracted position.

While the tire remover of the invention is susceptible of numerous physical embodiments, depending on the environment and requirements of use, substantial numbers of the herein shown and described embodiments have been made, tested and used, and all have performed in an eminently satisfactory manner.

The tire removing device of the invention, generally designated by the reference numeral 10, comprises a generally elongated framework including a pair of bottom channels 11 provided with suitable wheels 12 for ease in moving the apparatus.

Upstanding from the channels 11 is a plurality of pairs of structural members 13 and 14 serving rigidly to support a pair of longitudinal top channels 16, preferably of the I-beam type.

The after, or rear, ends of the I-beams 16 project in a rearward direction beyond the bottom channels 11 and, in conjunction with a connecting cross-member 17 serve to support an hydraulically actuated cylinder 21 and plunger 22 assembly. In conventional fashion, the cylinder 21 is connected by a pair of hoses 23 and 24 to a four-way valve 26 which controls the flow of hydraulic fluid to and from the usual hydraulic motor 27 and fluid reservoir 28. The hydraulic system elements, exclusive of the cylinder 21 and the plunger 22, are mounted at any convenient location on the framework, as between the structural members 13 and 14.

While the embodiment shown illustrates the use of hydraulically actuated elements, it is to be understood that pneumatic or electrical operation could also readily be resorted to.

Extension and retraction of the plunger 22 effects corresponding movement of a transverse shaft 31 to which the end of the plunger is affixed. Journaled on the opposite ends of the shaft 31 is a pair of forwardly extending arms 32, the forward ends of the arms 32, in turn, being secured to a transverse hollow sleeve 33, square in cross-section.

Fore and aft movement of the rectangular frame including the elements 31, 32 and 33, is guided by a pair of shoes 36, each of the shoes comprising a pair of arcuate side plates 37 straddling the adjacent I-beam 16, each plate including at the bottom an in-turned portion 38 underlying the subjacent top flange of the I-beam. Suitable fastenings 39 hold the side plates 37 in spaced relation and the ends of the cross shaft 31 are journaled in suitable openings 40 in the arcuate side plates. Thus, as the plunger moves in a fore and aft direction, the shoes 36 serve to guide the arms 32 in a straight path back and forth on the top of the I-beams.

Disposed within the transverse hollow sleeve 33 and partaking of the fore and aft movement of the sleeve is a transverse bar 41, square in cross-section and adapted to conform with the interior opening through the sleeve, the bar being thereby constrained against rotation about its longitudinal axis.

Adjacent the opposite ends of the transverse bar there is disposed a pair of hollow square collars 43 slidable on the bar 41. Mounted vertically on each of the collars 43 is an arcuately shaped plate 44, termed a jaw, the plate extending in a forward direction and terminating adjacent its forward end in an arcuately in-turned portion 46 adapted to engage the bead portion 51 of a tire 60 adjacent the back flange 53 of a wheel rim 54 (see FIGS. 3 and 4) and to break the bond between the tire bead and the adjacent rim flange as the tire bead engaging jaws 44 are urged against the tire by forward projection of the plunger 22.

Figure 4:
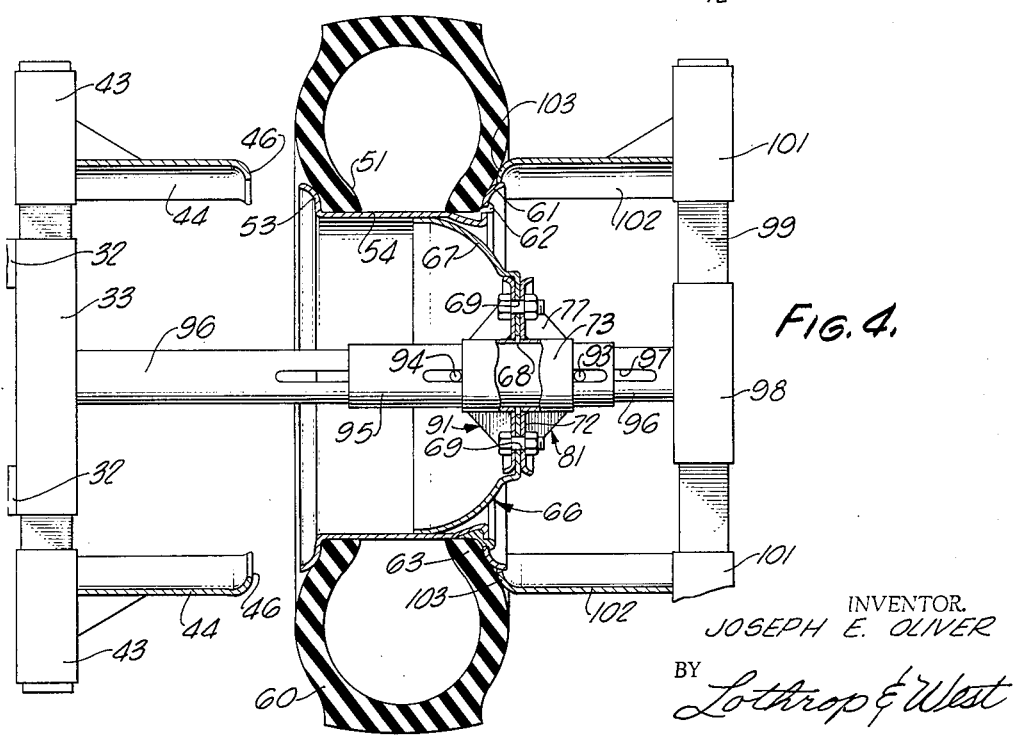
FIG. 4 is a fragmentary top plan view, to an enlarged scale, of a variant form of the device with a wheel mounted thereon, portions being shown in section.

The rim 54, as is most clearly shown in FIG. 4, is of a conventional variety and includes an outer margin on the side of the rim opposite the back flange 53. Customarily, the outer margin of the rim is provided with a side ring 61 or a lock ring 62 or a combination of these two rings.

The rings serve, in a well-known manner, to confine the outer tire bead 63 and, in the usual case, the ring or rings would be removed prior to mounting the wheel on the tire removing device. The bond between the rings and the adjacent tire bead is not ordinarily as hard to break as is the bond between the back flange 53 and the back bead 51. Where considerable difficulty is encountered with removing the rings, however, the FIG. 4 form of the device can readily perform the task, as will later be described in detail.

The form of wheel 66 shown in FIG. 4 is one that is widely used an includes, in addition to the rim structure, a dish-shaped disc 67 having the usual central opening 68 and a plurality of bolt holes 69 disposed in a circle for mounting on the vehicle's axle and attendant wheel mounting structure (not shown).

Serving to mount the wheel 66 on the tire removing device is a circular, annular wheel mounting plate 72 provided with a collar bearing 73 journaled on a central, fixed, fore and aft tube 74 rigidly supported by sturdy strut members 76 extending from the bottom channels 11 in a forward and upward direction. The annular plate 72 is rigidly affixed to the bearing 73 by suitably proportioned gussets 77. Formed in the annular mounting plate is a plurality of openings 79 adapted to register with the bolt holes 69 in the particular wheel 66 being serviced. In other words, at the tire removal station there would ordinarily be provided a variety of wheel mounting plate members capable of matching the usually encountered wheel disc bolt hole patterns.

Figure 2:
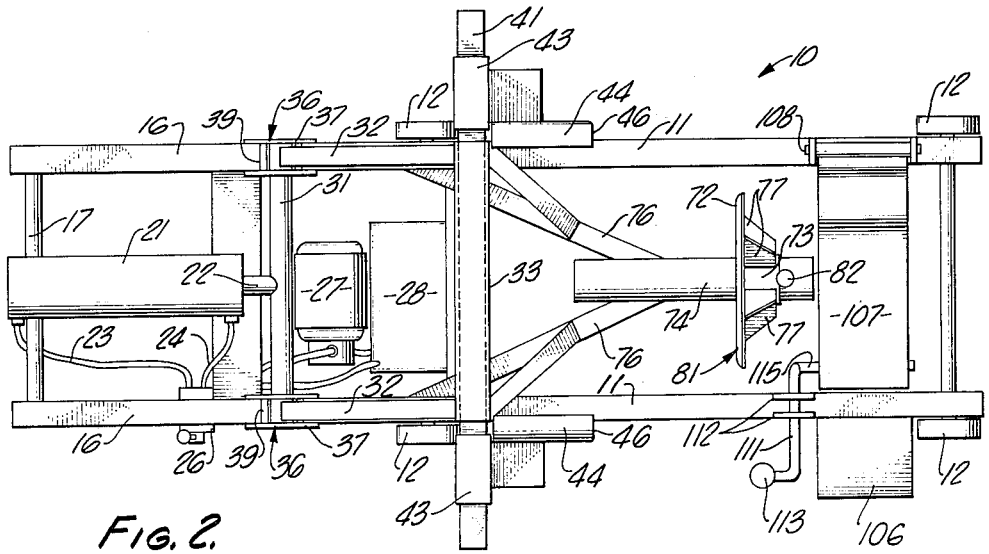
FIG. 2 is a top plan view thereof.
Figure 3:
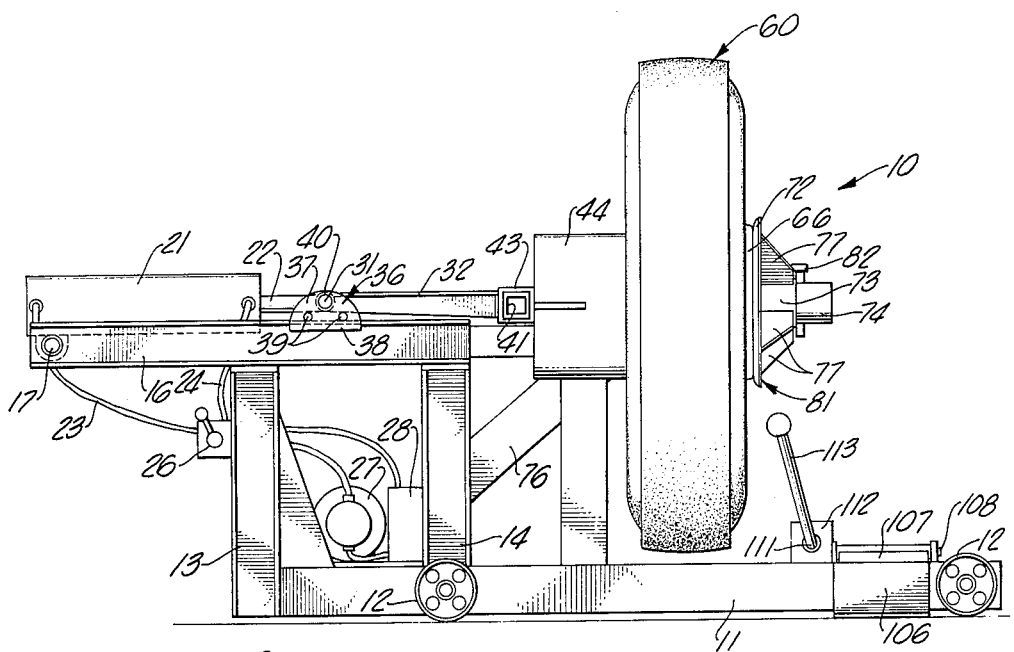
FIG. 3 is a side elevational view showing a wheel installed on the device and with the plunger in an extended position, preparatory to removal of the tire.

While the wheel mounting structure, generally designated by the numeral 81, is free to rotate about the fore and aft tube 74, the wheel holder 81 is constrained in the FIGS. 1–3 form of device against forward translational movement by virtue of a suitable pin 82 disposed in a diametral opening through the tube 74.

Thus, with the wheel's disc affixed to the wheel mounting structure 81 by two or more equally spaced fastenings 86, the bead engaging jaws can be brought to bear against the tire 60 adjacent the back rim flange 53 without moving the wheel itself.

In other words, as the jaws continue to move forwardly, the leading arcuate portions 46 of the jaws push against the tire and separate the bead from the back flange 53.

As previously stated, any side rings or lock rings will have been removed before the jaws are urged against the back tire bead. Consequently, continued forward extension of the plunger 22 and the jaws will urge the outer side of the tire well off the rim, making subsequent removal a simple task.

It should be recognized that in the operation of the device, the operator, having the control valve 26 near at hand, first causes the jaws to move slightly against the tire, followed by slight withdrawal of the jaws away from the tire. At this juncture, the wheel holder 81 and the wheel 66 are rotated a few degrees and the jaws are again carefully urged against the tire, followed by withdrawal of the jaws. This operation is repeated at appropriate locations around the bead until the bond is well broken. Then, additional biasing of the jaws against the tire will result in a translational or axial movement of the tire relative to the wheel. At this juncture, the fastenings 86 can be taken off and the wheel and dislodged tire removed from the device. Thereafter, removal of the tire from the wheel is a relatively simple matter.

FIG. 4 illustrates most clearly a variant form of the device used in situations where, as previously mentioned, difficulty is encountered in breaking the bond between the outer tire bead and the adjacent lock or side ring structure 62. In this form of the device a second, or inner wheel holding structure 91 is provided. The wheel holder 91 is substantially identical to the wheel holder 81, previously described and therefore requires no further comment except to say that the second holder is located with the annular plate 92 facing toward the annular plate 72 of the outer holder 81. An outer pin 93 and an inner pin 94 extending downwardly through the hollow tube 95 prevent axial movement in either direction of the wheel holders 81 and 91 and the interposed wheel 66.

Extending through the fixed tube 95 is a pull rod 96 having formed therein a longitudinal slot 97 extending entirely through the rod in a diametral direction. The pins 93 and 94 project through the slot 97 and thus prevent rotation of the pull rod 96 but permit translational movement thereof.

Mounted on the forward end of the pull rod 96 is a transverse sleeve 98 of hollow square cross-section and within the sleeve 98 is disposed a square in section cross bar 99, comparable in all respects to the transverse bar 41.

Also similar to the structure previously described is a pair of collars 101 slidably disposed on the cross bar 99, the collars each having mounted thereon an arcuate jaw plate 102 with an in-turned, arcuate tire bead engaging portion 103.

As is readily apparent from FIG. 4, with the cross bars located in straddling position with respect to the fixed wheel, the plunger 22 is first retracted so as to pull the jaw portions 103 into bond-breaking engagement with the outer bead of the tire. Several operations of the pull rod 96 may be necessary to effect the result. When the bond with the rings is broken, however, the rings can be removed followed by removal of the collars 101, and attendant jaws, and the cross bar 99 slid out of the sleeve 98.

Thereafter, the plunger can be projected outwardly so that the jaws 44 will break the inner bond in the manner heretofore described in detail. Then, the wheel is unfastened from the wheel holder and removed from the apparatus.

Mounting on and removal of the heavy and bulky wheel from the wheel holder is rendered more convenient owing to the provision of a side ramp 106 on which the tire can be rolled onto and away from a tire-supporting cradle 107. The cradle 107 is hinged, as on a hinge pin 108 mounted on the channel 11 on the side distant from the ramp 106. Any suitable mechanism can be used for swinging the cradle upwardly and downwardly to position the wheel. One such mechanism is shown in the drawings and includes a crank 111 journaled in a pair of brackets 112 upstanding from one of the channels 11. A crank arm 113 provides leverage, rearward angular movement of the arm 113 causing an upward swinging movement of a lever 115 projecting forwardly from the crank 111 and underlying the cradle 107. Since, in the usual case, the necessary extent of vertical movement of the wheel would be quite small, only a relatively small angular movement of the cradle is required.

While the foregoing description of the device relates to structure wherein the wheel is fixed and the tire dislodging jaws are movable, it also clearly is to be noted that in some installations, such as those on repair vehicles, it is sometimes preferable to make the jaws stationary and to mount the wheel on a plunger actuated structure capable of moving the wheel toward and away from the fixed jaws. It is, in other words, the relative movement between the component members of the device which effects the bond-breaking results.

It is also to be noted that the device is equally capable of handling dual wheels where such wheels are separated prior to installation on the device.

It can therefore be seen that I have provided a highly versatile and reliable apparatus which greatly reduces the amount of effort heretofore required in the removal of heavy duty vehicle tires.

What is claimed is:

1. A device for removing a tire from a vehicle wheel comprising:
   (a) a horizontally elongated frame having a forward end and an after end;
   (b) an axle mounted horizontally and longitudinally on said forward end of said frame;

(c) a circular wheel mounting plate rotatably mounted on said axle, and constrained against forward axial movement thereon, said mounting plate having a diameter less than the inside diameter of a tire being removed;

(d) means for removably fastening a vehicle wheel to said wheel mounting plate;

(e) a transverse bar member supported on said after end of said frame and being movable toward said forward end thereof;

(f) a pair of arcuate tire engaging jaws mounted adjacent the lateral ends of said bar; and, (g) means mounted on said after end of said frame for urging said bar and said jaws against a tire mounted on a wheel fastened to said wheel mounting plate for dislodgment of the tire in a forward direction and over said wheel mounting plate.

2. The device of claim 1 wherein said jaws are laterally adjustable on said transverse bar.

3. The device of claim 1 wherein said longitudinal axle is hollow, and said device also includes a longitudinal rod mounted at one end on said transverse bar and extending through said axle for translational movement with respect thereto, a cross bar mounted transversely on the other end of said rod, said cross bar being located forwardly from said wheel mounting plate, a pair of tire bead engaging members mounted adjacent the lateral ends of said cross bar; and, means for urging said rod and said tire bead engaging members in a rearward direction against the bead of a tire mounted on said wheel mounting plate for dislodgment of the tire bead in said rearward direction.

4. The device of claim 3 wherein said tire bead engaging members are laterally adjustable on said cross bar.

References Cited by the Examiner
UNITED STATES PATENTS

| | | | |
|---|---|---|---|
| 2,455,580 | 12/48 | Hewitt | 157—1.24 |
| 2,537,189 | 1/51 | King | 157—1.17 |
| 2,832,400 | 4/58 | Laughlin | 157—1.28 |

FRANK E. BAILEY, *Primary Examiner.*